United States Patent
Jaaskelainen et al.

(10) Patent No.: US 10,794,175 B2
(45) Date of Patent: Oct. 6, 2020

(54) MULTI-PARAMETER OPTICAL FIBER SENSING FOR RESERVOIR COMPACTION ENGINEERING

(71) Applicant: Halliburton Energy Services, Inc., Houston, TX (US)

(72) Inventors: Mikko Jaaskelainen, Katy, TX (US); Harold Grayson Walters, Tomball, TX (US); Ronald Glen Dusterhoft, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 133 days.

(21) Appl. No.: 15/743,505

(22) PCT Filed: Sep. 2, 2015

(86) PCT No.: PCT/US2015/048166
§ 371 (c)(1),
(2) Date: Jan. 10, 2018

(87) PCT Pub. No.: WO2017/039658
PCT Pub. Date: Mar. 9, 2017

(65) Prior Publication Data
US 2018/0202283 A1    Jul. 19, 2018

(51) Int. Cl.
*E21B 47/06*    (2012.01)
*E21B 47/13*    (2012.01)
(Continued)

(52) U.S. Cl.
CPC .............. *E21B 47/07* (2020.05); *E21B 43/16* (2013.01); *E21B 43/26* (2013.01); *E21B 47/06* (2013.01);
(Continued)

(58) Field of Classification Search
CPC ........ E21B 47/12; E21B 47/122; E21B 47/06; E21B 43/16; E21B 47/13
See application file for complete search history.

(56) References Cited

U.S. PATENT DOCUMENTS

| 5,872,876 A * | 2/1999 | Kluth ..................... G01H 9/004 385/12 |
| 6,317,540 B1 * | 11/2001 | Foulger .................... H01B 7/32 385/100 |

(Continued)

OTHER PUBLICATIONS

Canadian Application U.S. Appl. No. 2,986,373; First Office Action; dated Aug. 23, 2018, 3 pages.

(Continued)

*Primary Examiner* — Catherine Loikith
(74) *Attorney, Agent, or Firm* — Gilliam IP PLLC (57) ABSTRACT

Many monitoring systems, including distributed fiber optic sensing systems, are deployed to measure temperature, strain, acoustic, pressure, and electromagnetic data in a multi-well hydrocarbon field. By coupling disparate fiber optic cables together for strain sensing, a tubular cable is created that can be spooled and deployed as a single unit while allowing for multi-parameter sensing. Multiple tubular cables can measure and transmit sensing data from wellbores and geological formations. The data can be used to continually update a reservoir model and optimize production efficiency while also managing and mitigating subsidence by controlling injection and production rates.

17 Claims, 5 Drawing Sheets

(51) Int. Cl.
*E21B 43/16* (2006.01)
*E21B 47/12* (2012.01)
*E21B 47/07* (2012.01)
*E21B 43/26* (2006.01)
*G01V 11/00* (2006.01)
*E21B 47/135* (2012.01)

(52) U.S. Cl.
CPC ............ *E21B 47/135* (2020.05); *G01V 11/00* (2013.01); *G01V 11/002* (2013.01)

(56) References Cited

U.S. PATENT DOCUMENTS

| | | | | |
|---|---|---|---|---|
| 6,913,079 B2* | 7/2005 | Tubel | ...................... | E21B 47/00 114/382 |
| 7,154,081 B1 | 2/2006 | Friedersdorf et al. | | |
| 7,255,173 B2* | 8/2007 | Hosie | ...................... | E21B 21/08 166/250.01 |
| 7,769,260 B2* | 8/2010 | Hansen | ................. | E21B 17/206 385/100 |
| 7,859,943 B2* | 12/2010 | Herwanger | ......... | E21B 41/0064 367/38 |
| 8,280,709 B2* | 10/2012 | Koutsabeloulis | ....... | E21B 43/00 703/10 |
| 8,505,625 B2* | 8/2013 | Ravi | ...................... | E21B 33/14 166/250.14 |
| 10,370,909 B2* | 8/2019 | Thomas | ................. | D07B 1/162 |
| 2003/0094281 A1 | 5/2003 | Tubel | | |
| 2006/0153005 A1* | 7/2006 | Herwanger | ......... | E21B 41/0064 367/38 |

OTHER PUBLICATIONS

International Application Serial No. PCT/US2015/048166, International Search Report, dated May 18, 2016, 3 pages.
International Application Serial No. PCT/US2015/048166, International Written Opinion, dated May 18, 2016, 9 pages.

* cited by examiner

MULTI-PARAMETER OPTICAL FIBER SENSING FOR RESERVOIR COMPACTION ENGINEERING

BACKGROUND

This disclosure relates generally to the monitoring of reservoir parameters to anticipate compaction/subsidence on a field level using multi-parameter distributed sensing in multiple wells in a field.

Fiber optic distributed sensing systems were developed in the 1980s to replace older measurement systems composed of multiple individual sensors.

Fiber optic distributed sensing systems are often based on Optical Time-Domain Reflectometry (OTDR) and utilizes techniques originally derived from telecommunications cable testing. Today fiber optic distributed sensing systems provides a cost-effective way of obtaining hundreds, or even thousands, of highly accurate, high-resolution measurements and today find widespread acceptance in industries such as oil and gas, electrical power, and process control.

Subsidence and compaction are two related but distinct processes that can be significant issues in oil and gas reservoirs. There are several well-known cases in the oil and gas industries. Goose Creek field south of Houston was one of the first that received intense study. Subsidence over that field was first noticed in 1918, eventually reaching more than 3 ft [0.9 m] and submerging of the field. The Wilmington field in California, USA, several fields at Lake Maracaibo in Venezuela, and the Groningen field in The Netherlands all had noticeable subsidence that required remediation because the surface above the reservoirs was at or near sea level. The chalk fields in the Norwegian North Sea, notably Ekofisk, Eldfisk and Valhall fields, have compacted, and the resulting subsidence at the mudline generated concern for platform safety. Low-strength carbonate reservoirs in Northwest Java field, Indonesia, and fields offshore Sarawak, Malaysia, have also experienced significant subsidence. The Belridge field In California and neighboring diatomite fields subsided and had numerous well failures.

It is common to use various Enhanced Oil Recovery (EOR) methods to optimize hydrocarbon production, and water flooding is often used to sweep oil and re-pressurize reservoirs. Water saturated chalk compaction strength is lower compared with oil saturated compaction strength, so it is important to understand water front movement in reservoirs from a compaction perspective and also from an ultimate recovery perspective.

There is a need then for deeper insights into the phenomena associated with compaction and subsidence in order to update predictive reservoir models and control or optimize sweep efficiency while ensuring well integrity on a field level.

BRIEF DESCRIPTION OF THE DRAWINGS

FIG. 4 illustrates two examples of optical fiber as described in this application.

DETAILED DESCRIPTION

In the following detailed description, reference is made to accompanying drawings that illustrate embodiments of the present disclosure. These embodiments are described in sufficient detail to enable a person of ordinary skill in the art to practice the disclosure without undue experimentation. It should be understood, however, that the embodiments and examples described herein are given by way of illustration only, and not by way of limitation. Various substitutions, modifications, additions, and rearrangements may be made without departing from the spirit of the present disclosure. Therefore, the description that follows is not to be taken in a limited sense, and the scope of the present disclosure will be defined only by the final claims.

The description herein proposes to create a compaction and subsidence model as part of a field development plan and deploy multi-parameter sensing cables and micro-deformation sensors into the field wells as they are drilled and completed, and use them to monitor multiple simultaneous measurements of:

1. Wellbore strain where a strain sensing cable is coupled to the formation. This will allow a better understanding of compaction forces overtime as compaction may shear well casing and tubing.

2. Electro Magnetic (EM) sensing for monitoring water flood front movement. Reservoir compaction can then be anticipated before the water front reaches the wellbore and reduces the formation strength around the well. The information from the EM sensors can also be used to change settings of various inflow devices and thereby slow down the approaching water flood front.

3. Distributed Acoustic Sensing (DAS) can be used for 3D/4D seismic profiling and monitor pore pressure changes as water flood fronts move. DAS can also be used to monitor production in production wells as well as injection profiles in water injection wells.

4. Distributed Temperature Sensing (DTS) to monitor production in production wells as well as injection profiles in water injection wells. A good understanding of what reservoir layers take injected water can then be used to update reservoir models and predict areas of compaction. A correlation to production zones may also indicate communication between reservoir layers.

5. Pressure measurements which can be used to understand communication between wells, and can also be used for pressure build-up tests and to control maximum injection pressure.

6. Micro-deformation sensors like tilt meters may also be used to enhance the system and monitor subsidence above the reservoir and/or small changes to the wellbore deviation.

The multi-parameter cables can be deployed in both vertical and horizontal wells across a given field to monitor reservoir properties related to subsidence.

Figure 1:
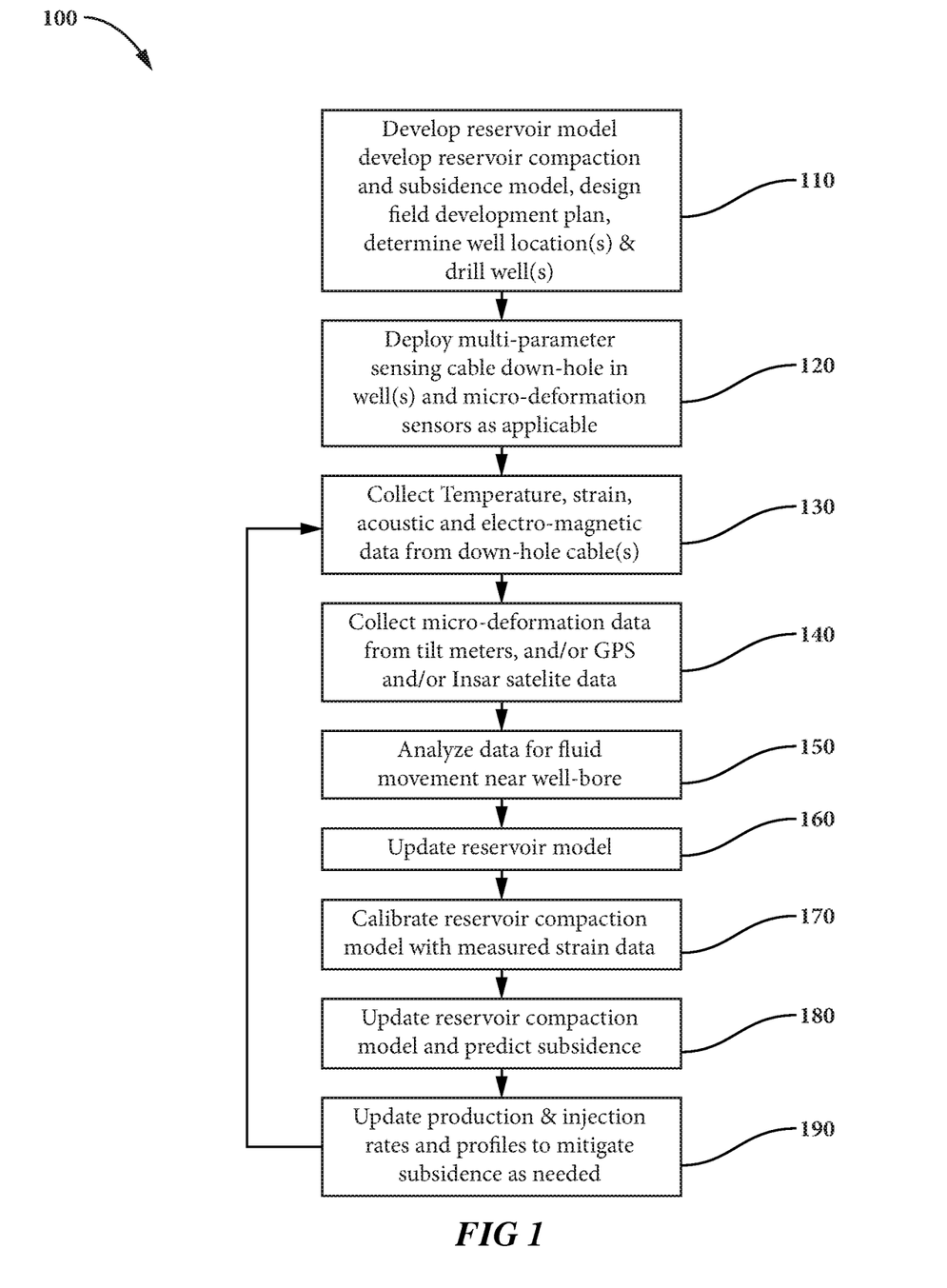
FIG. 1 illustrates a process flow for monitoring and mitigating subsidence in a field.

Referring to FIG. 1 a process flow 100 for monitoring and mitigating subsidence in a field can be described beginning in step 110 in which the overall field development plan, including the well locations is used to develop an initial reservoir compaction and subsidence model. As the wells are drilled the multi-parameter sensing cables and micro-deformation sensors are deployed 120 in each of the wells. As production begins the numerous temperature, strain, acoustic, and electromagnetic data is collected 130 and micro-deformation data is collected 140 from tilt meters and/or global positioning satellite (GPS) and/or Interferometric Synthetic Aperture Radar (InSAR) satellite data. Fluid movements are characterized 150 near each of the well bores from each region of the reservoir. This new information is used to then update 160 the reservoir model; the reservoir compaction model is then calibrated with the measured strain data 170 and the updated compaction model is then used to predict 180 subsidence. Finally 190 this information is used to modify both the production and water injection rates in the field development plan to optimize the overall reservoir performance while minimizing the longer-term deleterious effects of compaction and subsidence.

A good understanding of where injection fluids go, where produced fluids come from, and if any of the injected fluids reach producing wells as well as where in the producer wells injected fluids enter combined with far field 3D/4D seismic data and near wellbore/far field EM measurements to understand fluid migration will enable the field owner to update reservoir models and anticipate subsidence. This model can then be calibrated with strain data measured in the wellbore, and proactive measures used to minimize the impact of subsidence can then be monitored and controlled.

The reservoir compaction and subsidence model described herein is a complex multivariable computer program model that has instructions that can be carried out on any general purpose computing device that includes but is not limited to circuitry and/or programming for effecting the herein-referenced method aspects; the circuitry and/or programming can be virtually any combination of hardware, software, and/or firmware configured to effect the herein-referenced method aspects depending upon the design choices of the system designer. The general purpose computing device will be referred to herein as a computer device.

The multi-parameter cable can be used for continuous production logging even after compaction starts to deform wellbores whereas conventional through-tubing production logs may not be able to pass through a partially collapsed and/or buckled tubing.

Reservoir compaction is also very common in certain deepwater reservoirs in the Gulf of Mexico which are initially geo pressured to the point where pore pressure supports much of the over burden. These reservoirs initially have very high porosity and permeability, but as pressure depletes, sand grain shifting can result in significant losses in porosity (from as much as 39% to as approximately 25% due to grain shifting) and an associated loss in the effective permeability to oil. The effective permeability to oil is governed by both porosity and water saturation in this case and both change as a result of reservoir compaction of this type. In this situation the initial rock wettability is usually to water, so as oil is produced from the pore space and the reservoir compacts, the bulk volume water on the surface of the sand grains will tend to stay the same and as a result, the water saturation increases significantly when porosity is reduced. The result is a very significant loss in the effective permeability to oil, potentially in the range of 90% loss. Vertical wells or near vertical wells can be highly susceptible to wellbore failure due to compaction in this environment and different means of monitoring compaction have been deployed such as insertion of radioactive tags at each casing joint collar followed by routine logging to measure the change in distance between these points in time and in some cases even sonic image logging to monitor casing deformation over time due to strain and buckling. Both of these solutions require well intervention activities that result in shut-in production on a platform and can have significant cost, especially in an environment where sub-sea wellheads are utilized. Highly deviated or horizontal wells are usually much less susceptible to failure due to reservoir compaction because the wellbore is only exposed to a very small portion of the reservoir in the vertical plane. In this environment, however, non-uniform compaction can be a problem if shale layers are encountered that will not compact. Pipe bending and kinking above or below these interfaces can also pose wellbore integrity issues.

With the use of water injection in many of these reservoirs, the wellbore integrity issues can be compounded by formation fines migration and associated formation plugging and sand production. This can also severely impact well integrity. Water injection wells are also highly subject to failures in this environment due to a host of issues, but often resulting from significant cross flow from high pressured reservoir sections into lower pressured reservoir sections resulting in erosion of the completion, solids production and fill accumulating in the wellbore.

Continuous monitoring of both flow and compaction would enable means of preventing these problems to be deployed early to minimize the well integrity issues and reduce intervention requirements.

Figure 2:
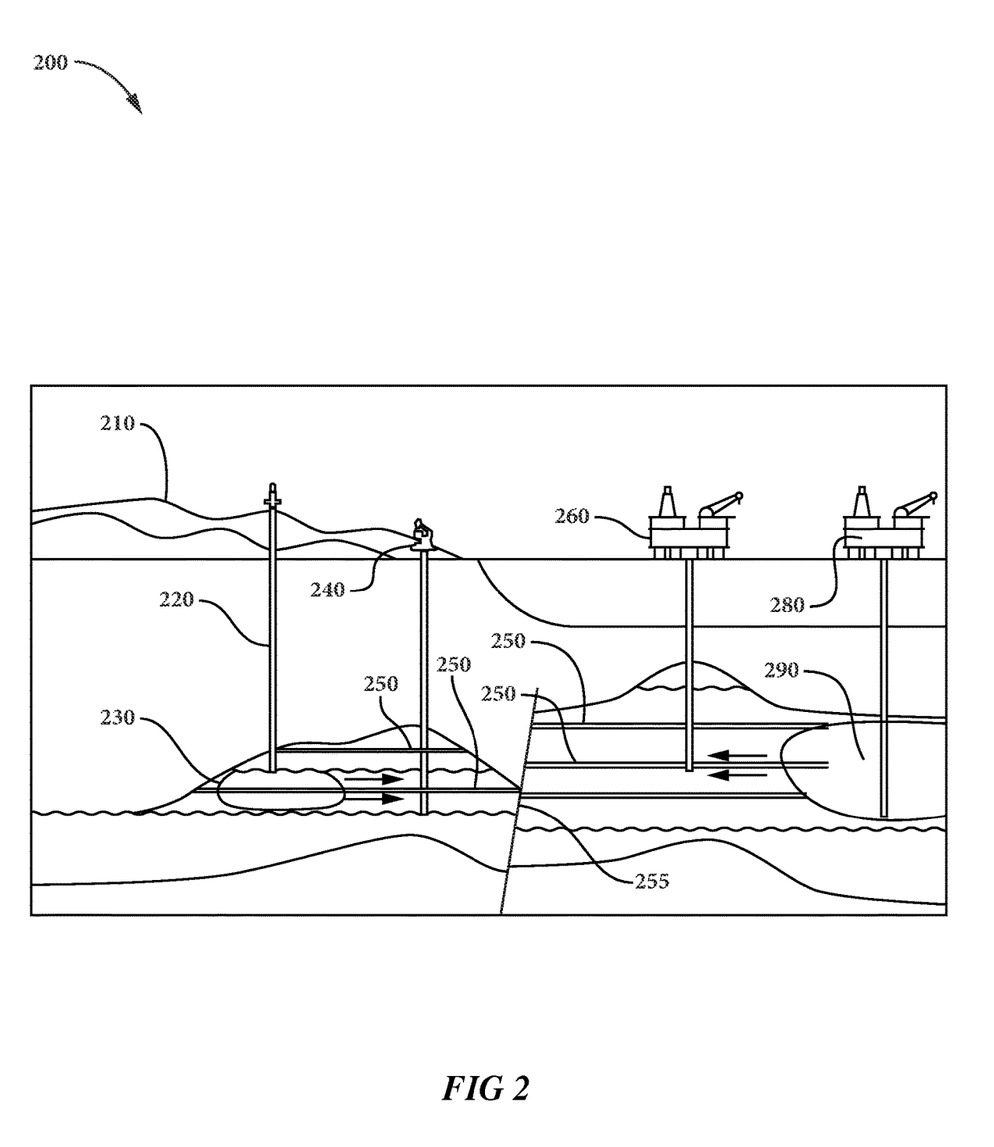
FIG. 2 illustrates a simple description of fields where the proposal of this application can be used.

FIG. 2, shown generally as the numeral 200, represents a simplified description of possible applications of this methodology. The sensing cables to be described can be deployed in multiple wells and additional micro-deformation sensors can be added. The approach can be used on the seafloor (offshore) or on the surface (onshore). Onshore a production well 240 located on a land surface 210 is extracting hydrocarbons from a deep formation that may have multiple horizontal hydraulic fractures 250. Nearby a water injection well 220 is used to inject a water flood 230 that drives hydrocarbons toward the production well 240. Offshore a production platform 260 can be extracting hydrocarbons from a different formation separated by a fault line 255. An injection well 280 located offshore is creating a water flood 290 for driving hydrocarbons toward production platform 260. As production progresses and the detection of compaction appears the relative rates of production and water flooding are then varied to minimize the risk of equipment failures due to the stresses of compaction and subsidence. As a general rule as compaction is detected production flow is decreased and water floods increased.

Figure 3:
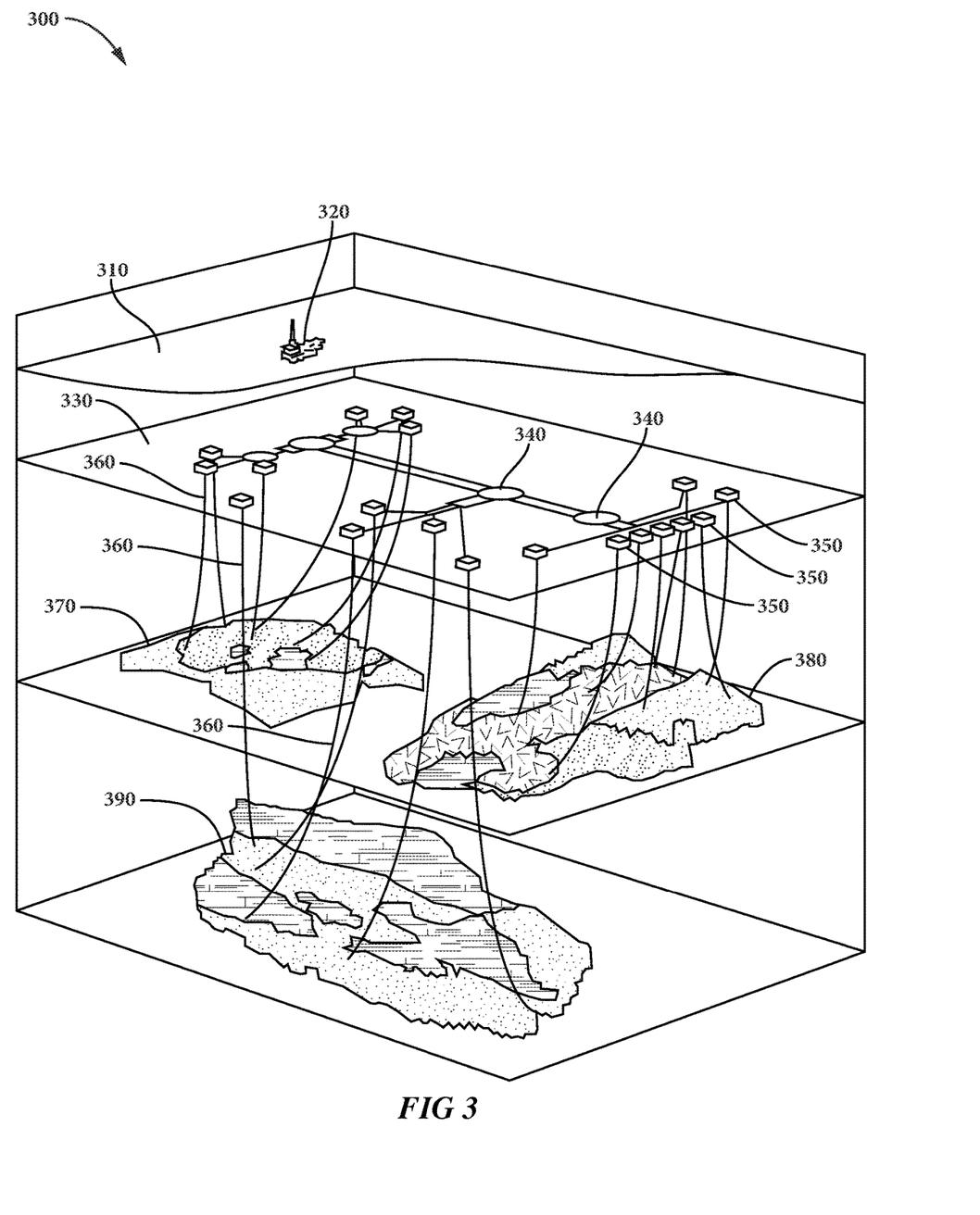
FIG. 3 illustrates a more complex image of multiple reservoirs where production and injection can be monitored and production rates can be used to mitigate subsidence that could impact seafloor infrastructure including flow lines and pipelines.

A more complex illustration of possible offshore applications is shown in FIG. 3, generally represented by the numeral 300. In this multilevel representation the sea surface 310 has a production platform 320 connected (not shown) via multiple sub-sea manifolds 340 to multiple sub-sea wellheads 350 on the seafloor 330. These well heads have been drilled further and are thus connected 360 into various rock formations 370, 380, 390 for hydrocarbon extraction. Each formation can have multiple geologic structures, with different porosities so that each will have different production performance. In addition compaction and subsidence will vary across the formations during production.

Multi-Parameter Sensing

Deployment of multi-parameter single point sensing systems in wells as single point sensors require cables to be cut at every point where a sensor is inserted. This drives manufacturing complexity, cost and reliability as well as large humps at every point where the single point sensor is inserted. Spooling and handling these single point sensor cables can be complex. The other option is to run multiple cables, one for each individual sensor cable, and that once again drives cost and complexity. Having cables with big sensor lumps or clusters at points along a cable drives deployment complexity as cable stand-offs and centralizers are required to protect the sensors from damage during installation into the bore hole. Dedicated sensor mandrels may also be required and this further drives the cost and complexity. A larger diameter wellbore may also be required to accommodate the larger OD single point sensors, so bore hole stability concerns become important and cost increases significantly when a larger wellbore must be drilled and completed.

The proposal described herein is a distributed multi-parameter fiber optic sensing cable capable of monitoring several parameters of interest in subsurface wells, and in particular subsurface wells related to hydrocarbon production. The cable will be a truly distributed cable with a uniform tubular structure that can easily be cabled and deployed. The preferred size of the tubular cable would be in the range of ⅛"-¼" where the fibers are tightly coupled to the tubular cable. The cable should be capable of monitoring several or all of the following parameters:

1. Wellbore strain where a strain sensing cable is coupled to the formation. Knowledge of wellbore strain can be used understand compaction related issues where tubulars may buckle, collapse or shear. Wellbore strain can also be used to detect fracture initiation points as the formation opens up when the rock splits open. Strain can also be used to measure frac propagation direction and magnitude from a well being fractured towards a neighboring well instrumented with a strain sensing cable. The strain sensing system may be based upon one or more of several measurement principles like e.g. Brillouin, Rayleigh, Fiber Bragg Gratings or interferometric sensors based on Fabry-Perot, Michelson or Mach-Zehnder principles etc. The cable would be a tubular cable of around ¼" OD with good strain coupling from the outer boundary of the cable to the strain sensing fiber(s).

2. Electro Magnetic (EM) sensing for monitoring formation resistivity. Various fluids have different resistivity, and monitoring resistivity can provide an enhanced understanding of subsurface properties related to hydrocarbon production in sub-surface wells. The EM measurements may be near wellbore measurements when combined with in-well EM emitting sources or far field monitoring when combined with surface/ocean floor/neighboring well emitting sources.

3. Distributed Acoustic Sensing (DAS) based on coherent Rayleigh scattering can be used for 3D/4D seismic profiling and monitor pore pressure changes as water flood fronts move, DAS can also be used to monitor production in production wells as well as injection profiles in water injection wells. The cable would use a dedicated fiber for monitoring acoustic energy or share a fiber with the EM sensing and/or strain sensing fibers where each of the systems operate at different optical frequencies. The DAS system may use multiple lasers and utilize multiple fibers for monitoring acoustic energy as an option or maximize Signal to Noise Ratio (SNR) In the system. The system may include Fabry-Perot based quasi-distributed sensing systems where the cable may have a fiber with Fiber Bragg Gratings (FBGs) where one or multiple pairs of FBGs form Fabry-Perot cavities with enhanced acoustic sensitivity when compared with Rayleigh based DAS systems.

4. Distributed Temperature Sensing (DTS) can be used to monitor production in production wells as well as injection profiles in water injection wells. A good understanding of what reservoir layers take injected water can then be used to update reservoir models, and DTS data can also be used to calculate how much frac fluid has entered any given perforation or fracture initiation point. The cable would include single and/or multi-mode fibers for DTS, and the system would preferably use a dual wavelength DTS capable of mitigating hydrogen and/or cable manufacturing related optical attenuation.

5. Pressure measurements are useful to understand communication between wells, and can also be used for pressure build-up tests. A pressure/temperature sensor can be placed at the distal end of the cable. Pressure measurements can also be used to monitor and keep injection pressures within desired ranges and also monitor reservoir pressure in production wells.

Figure 4A:
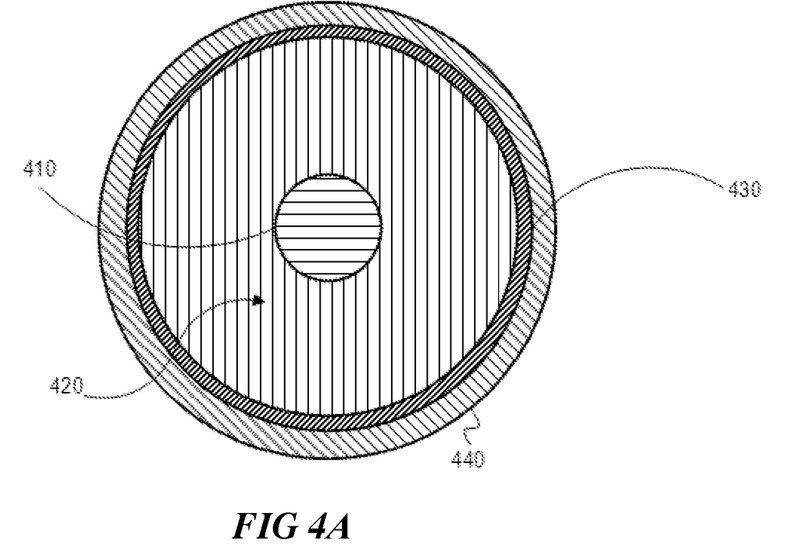
FIG. 4A illustrates an example of optical fiber with a hermetic coating.

FIG. 4 illustrates two examples of optical fibers as described in this application. In FIG. 4A the fiber core 410 is surrounded by a fiber cladding 420, and then a hermetic coating 430. The outer coating is a polymeric coating 440.

Figure 4B:
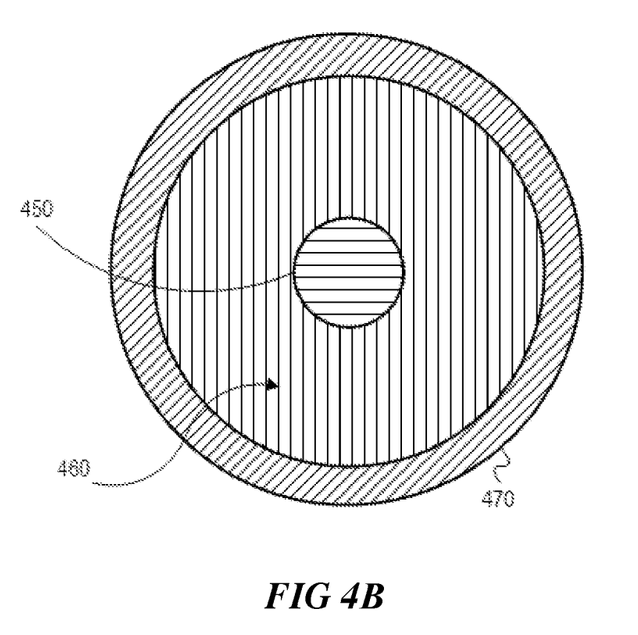
FIG. 4B illustrates an example of optical fiber with a magnetostrictive coating.

In FIG. 4B an alternative example is a fiber core 450 surrounded by a fiber cladding 460 and a magnetostrictive coating 470.

Figure 5:
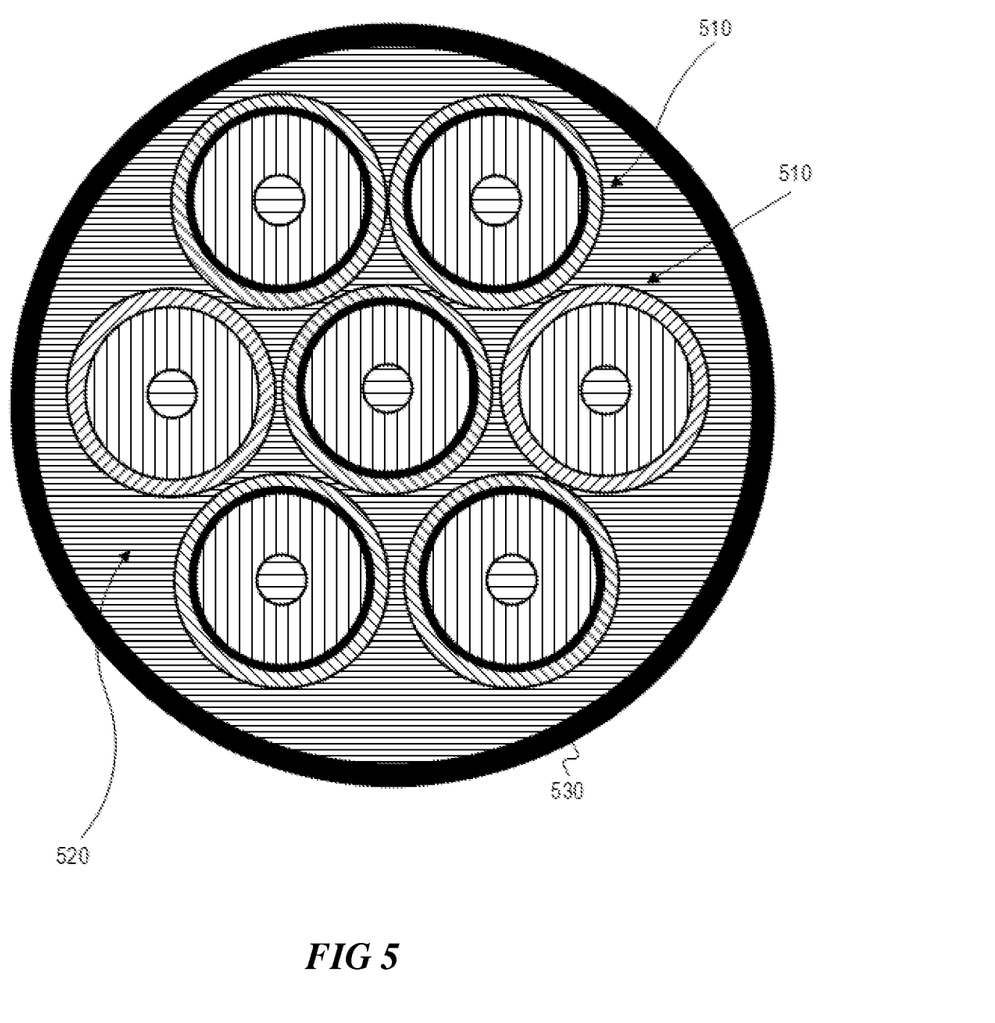
FIG. 5 illustrates another example of a cable construction using multi-parameter optical fibers as described in this application.

FIG. 5 is an illustration of a possible cable construction (multiple optical fibers) as described herein. Multiple optical fibers 510 are surrounded by a suitable strain coupling filler material 520 with the entire cable enclosed in a cable sheath 530.

Many prior art cables used for distributed fiber optic sensing are gel filled loose tube cables with strain isolated fibers floating in the gel. The proposed configuration shown in FIG. 5 is aimed at creating a cable where the fibers are tightly coupled in the cable for proper strain transfer. This approach can lead to a reduction in cost and risk and ease deployment while enabling new sensing solutions in the field.

Although certain embodiments and their advantages have been described herein in detail, it should be understood that various changes, substitutions and alterations could be made without departing from the coverage as defined by the appended claims. Moreover, the potential applications of the disclosed techniques are not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized. Accordingly, the appended claims are intended to include within their scope such processes, machines, manufactures, means, methods or steps.

The invention claimed is:
1. A method comprising:
 collecting temperature, strain, and acoustic data from distributed sensing fiber optic cables;
 identifying fluid movement near one or more wellbores based on the collected data;
 updating a reservoir compaction and subsidence model to predict subsidence based, at least in part, on the identified fluid movement;
 calibrating the reservoir compaction and subsidence model against the strain data;
 profiling seismic data in 3D/4D based, at least in part, on the collected acoustic data; and monitoring at least one of pore pressure changes as flood fronts move, production in production wells, and injection profiles of injection wells.

2. The method of claim 1 further comprising:
developing an overall field and well plan based, at least in part, on the reservoir compaction and subsidence model; and
deploying the distributed sensing fiber optic cables based, at least in part, on the overall field and well plan.

3. The method of claim 2 further comprising:
drilling the one or more wellbores based, at least in part, on the overall field and well plan.

4. The method of claim 1 further comprising:
monitoring production and injection profiles at the one or more wellbores based, at least in part, on Distributed Temperature Sensing (DTS) data,
wherein collecting temperature data comprises collecting DTS data.

5. The method of claim 1 further comprising:
monitoring compaction forces over time based, at least in part, on the collected strain data.

6. The method of claim 1, further comprising:
collecting at least one of pressure and electromagnetic data from the distributed sensing fiber optic cables.

7. The method of claim 6 further comprising:
monitoring fluid front movement based, at least in part, on the collected electromagnetic data.

8. The method of claim 1, further comprising:
updating production and injection rates at the one or more wellbores to mitigate subsidence, wherein updating the production and injection rates is based, at least in part, on the updated compaction and subsidence model.

9. The method of claim 1, further comprising:
collecting micro-deformation data from at least one of tilt meters, a global positioning satellite, and an Interferometric Synthetic Aperture Radar (InSAR) satellite data.

10. A tubular cable for distributed sensing and simultaneous monitoring of multiple parameters in sub-surface wells comprising:
multiple fiber optic cables tightly coupled within a uniformly tubular cable sheath;
one or more of the multiple fiber optic cables comprising an internal optical fiber surrounded by a fiber cladding material, and an outer polymer coating; and
a suitable strain coupling filler material surrounding the multiple fiber optic cables and the multiple fiber optic cables coupled to the uniformly tubular cable sheath for strain transfer.

11. The tubular cable of claim 10,
wherein at least one optical fiber comprises a distributed temperature sensing (DTS) fiber,
wherein at least one optical fiber comprises a distributed acoustic sensing (DAS) fiber, and
wherein at least one optical fiber comprises a distributed strain sensing (DSS) fiber.

12. The tubular cable of claim 10, further comprising:
one or more fiber optic cable comprising an internal optical fiber surrounded by a fiber cladding material, and an outer magnetostrictive coating, and
wherein at least one internal optical fiber is a distributed electro-magnetic sensing (DEMS) fiber.

13. A method comprising:
collecting temperature, strain, and acoustic data from distributed sensing fiber optic cables;
collecting pressure data;
identifying fluid movement for fluid injected at one or more wellbores based, at least in part, on the pressure data;
updating a reservoir compaction and subsidence model to predict subsidence based, at least in part, on the identified fluid movement;
calibrating the reservoir compaction and subsidence model against the strain data; and
controlling injection pressure based, at least in part, on the fluid movement.

14. The method of claim 13 further wherein collecting pressure data comprises collecting pressure data from the distributed sensing fiber optic cables.

15. The method of claim 13 further comprising:
collecting electromagnetic data from the distributed sensing fiber optic cables.

16. The method of claim 13, further comprising:
updating production and injection rates at the one or more wellbore to mitigate subsidence.

17. The method of claim 13, further comprising:
collecting micro-deformation data from at least one of tilt meters, a global positioning satellite, and an Interferometric Synthetic Aperture Radar (InSAR) satellite data.

* * * * *